United States Patent
Claussen

(10) Patent No.: US 7,545,935 B2
(45) Date of Patent: Jun. 9, 2009

(54) NETWORKED MULTIMEDIA OVERLAY SYSTEM

(75) Inventor: Paul J. Claussen, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 762 days.

(21) Appl. No.: 10/842,823

(22) Filed: May 11, 2004

(65) Prior Publication Data

US 2005/0005287 A1    Jan. 6, 2005

Related U.S. Application Data

(63) Continuation-in-part of application No. 10/342,670, filed on Jan. 15, 2003.

(60) Provisional application No. 60/416,155, filed on Oct. 4, 2002, provisional application No. 60/424,269, filed on Nov. 6, 2002.

(51) Int. Cl.
*H04N 7/167* (2006.01)

(52) U.S. Cl. .............. 380/200; 380/210; 380/228; 380/239; 725/31; 725/74; 725/119; 725/131; 725/151

(58) Field of Classification Search ............ 380/200, 380/210, 228, 239; 725/31, 74, 119, 131, 725/151
See application file for complete search history.

(56) References Cited

U.S. PATENT DOCUMENTS

| | | | |
|---|---|---|---|
| 4,215,366 A * | 7/1980 | Davidson ............... | 380/235 |
| 4,290,081 A | 9/1981 | Foerster ............... | 358/4 |
| 4,439,784 A | 3/1984 | Furukawa et al. | |
| 4,535,355 A * | 8/1985 | Arn et al. ............... | 380/212 |
| 4,540,958 A | 9/1985 | Neyens et al. ............ | 332/16 |
| 4,578,533 A | 3/1986 | Pierce | |
| 4,686,564 A | 8/1987 | Masuko et al. | |
| 4,706,121 A | 11/1987 | Young | |

(Continued)

FOREIGN PATENT DOCUMENTS

EP    0912054    4/1999

(Continued)

OTHER PUBLICATIONS

Scientific-Atlanta, Inc. Pending U.S. Appl. No. 10/008,581, filed Nov. 13, 2001, entitled "Networked Subscriber Television Distribution," Inventors: Samuel H. Russ, David B. Lett, Jonathan A. Robinson, and Michael A. Gaul.

(Continued)

*Primary Examiner*—David García Cervetti
(74) *Attorney, Agent, or Firm*—Merchant & Gould

(57) ABSTRACT

Systems and methods are disclosed for providing encrypted downstream signals to a plurality of receiver devices 130, 135, 140, where the devices 130, 135, 140 may have different decryption devices. A receiver network (i.e., a networked multimedia system) includes a splitter/isolation module (SIM) 125, a primary set-top terminal (STT) 130, and at least one remote device 135, 140. The remote devices 135, 140 communicate with the primary STT 130 via the SIM 125 over coaxial cable. Accordingly, the remote devices 135, 140 are capable of requesting and receiving stored programs via the networked multimedia overlay system. Depending upon the decryption device included in the requesting remote STT 135, 140, the primary STT 130 sends a stored program encrypted according to that decryption device.

3 Claims, 4 Drawing Sheets

U.S. PATENT DOCUMENTS

| | | | |
|---|---|---|---|
| 4,751,578 A | 6/1988 | Reiter et al. | |
| 4,885,803 A | 12/1989 | Hermann et al. | |
| 4,908,713 A | 3/1990 | Levine | |
| 4,916,532 A | 4/1990 | Streck et al. | |
| 4,963,994 A | 10/1990 | Levine | |
| 4,963,995 A | 10/1990 | Lang | |
| 5,010,299 A | 4/1991 | Nishizawa et al. | |
| 5,010,399 A | 4/1991 | Goodman et al. | 358/85 |
| 5,038,211 A | 8/1991 | Hallenbeck | |
| 5,048,054 A | 9/1991 | Eyuboglu et al. | |
| 5,251,074 A | 10/1993 | Hamma et al. | 360/10.1 |
| 5,253,066 A | 10/1993 | Vogel | |
| 5,293,357 A | 3/1994 | Hallenbeck | |
| 5,406,626 A | 4/1995 | Ryan | 380/9 |
| 5,412,416 A | 5/1995 | Nemirofsky | |
| 5,479,268 A | 12/1995 | Young et al. | |
| 5,481,542 A | 1/1996 | Logston et al. | |
| 5,508,815 A | 4/1996 | Levine | |
| 5,515,377 A | 5/1996 | Horne et al. | |
| 5,524,051 A | 6/1996 | Ryan | 380/9 |
| 5,568,272 A | 10/1996 | Levine | |
| 5,574,964 A | 11/1996 | Hamlin | |
| 5,579,308 A | 11/1996 | Humpleman | |
| 5,590,195 A | 12/1996 | Ryan | 380/9 |
| 5,600,364 A | 2/1997 | Hendricks et al. | |
| 5,600,573 A * | 2/1997 | Hendricks et al. | 725/109 |
| 5,600,707 A | 2/1997 | Miller, II | |
| 5,621,793 A | 4/1997 | Bednarek et al. | |
| 5,638,423 A | 6/1997 | Grube et al. | |
| 5,666,151 A | 9/1997 | Kondo et al. | |
| 5,682,206 A | 10/1997 | Wehmeyer et al. | |
| 5,699,105 A | 12/1997 | Chen et al. | |
| 5,701,383 A | 12/1997 | Russo et al. | 386/46 |
| 5,708,961 A | 1/1998 | Hylton et al. | 455/4.2 |
| 5,714,945 A | 2/1998 | Sakuma et al. | |
| 5,715,020 A | 2/1998 | Kuroiwa et al. | |
| 5,715,277 A | 2/1998 | Goodson et al. | |
| 5,751,806 A | 5/1998 | Ryan | 380/9 |
| 5,758,257 A | 5/1998 | Herz et al. | |
| 5,774,527 A | 6/1998 | Handelman et al. | |
| 5,787,472 A | 7/1998 | Dan et al. | 711/134 |
| 5,793,413 A | 8/1998 | Hylton et al. | 348/12 |
| 5,793,414 A | 8/1998 | Shaffer | |
| 5,796,442 A | 8/1998 | Gove et al. | |
| 5,808,659 A | 9/1998 | Coutinho et al. | |
| 5,809,204 A | 9/1998 | Young et al. | |
| 5,828,403 A * | 10/1998 | DeRodeff et al. | 725/131 |
| 5,835,128 A | 11/1998 | MacDonald et al. | |
| 5,851,149 A * | 12/1998 | Xidos et al. | 463/42 |
| 5,867,485 A | 2/1999 | Chambers et al. | |
| 5,872,644 A | 2/1999 | Yamazaki et al. | |
| 5,886,732 A * | 3/1999 | Humpleman | 725/49 |
| 5,886,753 A | 3/1999 | Shinyagaito et al. | |
| 5,915,068 A | 6/1999 | Levine | |
| 5,920,801 A | 7/1999 | Thomas et al. | |
| 5,930,247 A | 7/1999 | Miller, II et al. | |
| 5,936,660 A | 8/1999 | Gurantz | |
| 5,940,073 A | 8/1999 | Klosterman et al. | |
| 5,940,387 A | 8/1999 | Humpleman | |
| 5,970,386 A * | 10/1999 | Williams | 725/69 |
| 5,983,068 A | 11/1999 | Tomich et al. | |
| 5,990,927 A | 11/1999 | Hendricks et al. | |
| 5,995,258 A | 11/1999 | Weber et al. | |
| 5,999,622 A * | 12/1999 | Yasukawa et al. | 705/51 |
| 6,005,861 A | 12/1999 | Humpleman | |
| 6,014,546 A | 1/2000 | Georges et al. | |
| 6,026,150 A | 2/2000 | Frank | |
| 6,037,998 A | 3/2000 | Usui et al. | |
| 6,055,355 A | 4/2000 | Lee | 386/70 |
| 6,061,449 A * | 5/2000 | Candelore et al. | 380/28 |
| 6,073,122 A * | 6/2000 | Wool | 705/51 |
| 6,091,320 A | 7/2000 | Odinak | 340/310.01 |
| 6,100,936 A | 8/2000 | Jordan et al. | |
| 6,118,873 A * | 9/2000 | Lotspiech et al. | 380/277 |
| 6,151,493 A | 11/2000 | Sasakura et al. | |
| 6,169,543 B1 | 1/2001 | Wehmeyer | |
| 6,172,712 B1 | 1/2001 | Beard | 348/552 |
| 6,181,784 B1 | 1/2001 | Duran et al. | 379/93.21 |
| 6,182,287 B1 | 1/2001 | Schneidewend et al. | |
| 6,215,526 B1 | 4/2001 | Barton et al. | 348/473 |
| 6,219,839 B1 | 4/2001 | Sampsell | |
| 6,229,895 B1 * | 5/2001 | Son et al. | 380/200 |
| 6,233,389 B1 | 5/2001 | Barton et al. | 386/46 |
| 6,240,555 B1 | 5/2001 | Shoff et al. | |
| 6,243,142 B1 | 6/2001 | Mugura et al. | |
| 6,263,503 B1 | 7/2001 | Margulis | |
| 6,285,746 B1 | 9/2001 | Duran et al. | 379/93.21 |
| 6,286,140 B1 | 9/2001 | Ivanyi | |
| 6,286,142 B1 | 9/2001 | Ehreth | |
| 6,305,017 B1 | 10/2001 | Satterfield | |
| 6,310,886 B1 | 10/2001 | Barton | 370/462 |
| 6,317,884 B1 | 11/2001 | Eames et al. | 725/78 |
| 6,324,338 B1 | 11/2001 | Wood et al. | 386/83 |
| 6,327,418 B1 | 12/2001 | Barton | 386/46 |
| 6,330,334 B1 | 12/2001 | Ryan | 380/237 |
| 6,353,929 B1 | 3/2002 | Houston | |
| 6,377,782 B1 | 4/2002 | Bishop et al. | |
| 6,415,031 B1 * | 7/2002 | Colligan et al. | 380/200 |
| 6,418,558 B1 * | 7/2002 | Roberts et al. | 725/129 |
| 6,421,706 B1 | 7/2002 | McNeill et al. | |
| 6,424,947 B1 | 7/2002 | Tsuria et al. | |
| 6,442,755 B1 | 8/2002 | Lemmons et al. | |
| 6,452,923 B1 | 9/2002 | Gerszberg et al. | |
| 6,481,013 B1 * | 11/2002 | Dinwiddie et al. | 725/80 |
| 6,483,548 B1 | 11/2002 | Allport | |
| 6,493,875 B1 * | 12/2002 | Eames et al. | 725/81 |
| 6,496,980 B1 | 12/2002 | Tillman et al. | |
| 6,505,348 B1 | 1/2003 | Knowles et al. | |
| 6,526,581 B1 * | 2/2003 | Edson | 725/74 |
| 6,530,085 B1 | 3/2003 | Perlman | |
| 6,535,717 B1 | 3/2003 | Matsushima et al. | |
| 6,536,041 B1 | 3/2003 | Knudson et al. | |
| 6,542,610 B2 * | 4/2003 | Traw et al. | 380/262 |
| 6,567,981 B1 | 5/2003 | Jeffrey | |
| 6,578,070 B1 | 6/2003 | Weaver et al. | |
| 6,588,017 B1 * | 7/2003 | Calderone | 725/120 |
| 6,594,798 B1 | 7/2003 | Chou et al. | |
| 6,614,936 B1 * | 9/2003 | Wu et al. | 382/238 |
| 6,622,304 B1 * | 9/2003 | Carhart | 725/74 |
| 6,622,307 B1 * | 9/2003 | Ho | 725/120 |
| 6,637,031 B1 | 10/2003 | Chou | |
| 6,681,326 B2 * | 1/2004 | Son et al. | 713/150 |
| 6,697,426 B1 | 2/2004 | Van Der Schaar et al. | |
| 6,697,489 B1 | 2/2004 | Candelore | |
| 6,704,028 B2 | 3/2004 | Wugofski | |
| 6,711,132 B2 | 3/2004 | Lazarus | |
| 6,735,221 B1 | 5/2004 | Cherubini | |
| 6,735,312 B1 * | 5/2004 | Abdalla et al. | 380/239 |
| 6,757,906 B1 | 6/2004 | Look et al. | |
| 6,766,526 B1 | 7/2004 | Ellis | |
| 6,771,908 B2 | 8/2004 | Eijk et al. | |
| 6,789,106 B2 | 9/2004 | Eyer et al. | |
| 6,791,995 B1 * | 9/2004 | Azenkot et al. | 370/436 |
| 6,795,205 B1 | 9/2004 | Gacek | |
| 6,804,357 B1 * | 10/2004 | Ikonen et al. | 380/241 |
| 6,816,194 B2 | 11/2004 | Zhang et al. | |
| 6,864,778 B2 | 3/2005 | Musschebroeck et al. | |
| 6,868,292 B2 | 3/2005 | Ficco et al. | |
| 6,870,570 B1 | 3/2005 | Bowser | |
| 6,889,385 B1 * | 5/2005 | Rakib et al. | 725/119 |
| 6,904,522 B1 * | 6/2005 | Benardeau et al. | 713/156 |
| 6,915,529 B1 | 7/2005 | Suematsu et al. | |
| 6,930,788 B1 | 8/2005 | Iwamoto et al. | |
| 6,950,517 B2 * | 9/2005 | Hawkes et al. | 380/37 |

| | | |
|---|---|---|
| 6,957,344 B1 * | 10/2005 | Goldshlag et al. ............ 713/194 |
| 6,996,837 B1 | 2/2006 | Miura et al. |
| 7,020,890 B1 | 3/2006 | Suematsu et al. |
| 7,039,938 B2 * | 5/2006 | Candelore ..................... 725/87 |
| 7,047,305 B1 | 5/2006 | Brooks et al. |
| 7,054,289 B1 | 5/2006 | Foster et al. |
| 7,093,295 B1 * | 8/2006 | Saito ........................... 726/26 |
| 7,127,734 B1 * | 10/2006 | Amit ............................ 725/80 |
| 7,139,398 B2 * | 11/2006 | Candelore et al. ........... 380/200 |
| 7,140,033 B1 | 11/2006 | Durden et al. |
| 7,146,628 B1 | 12/2006 | Gordon et al. |
| 7,155,012 B2 * | 12/2006 | Candelore et al. ........... 380/214 |
| 7,184,550 B2 * | 2/2007 | Graunke ...................... 380/42 |
| 7,190,901 B2 | 3/2007 | Farmer et al. |
| 7,209,667 B2 | 4/2007 | Lindblad |
| 7,218,738 B2 * | 5/2007 | Pedlow et al. ................ 380/218 |
| 7,222,358 B2 | 5/2007 | Levinson et al. |
| 7,233,669 B2 * | 6/2007 | Candelore ................... 380/210 |
| 7,260,829 B1 | 8/2007 | Hendricks et al. |
| 7,305,700 B2 * | 12/2007 | Boynton et al. ................ 726/4 |
| 7,310,355 B1 | 12/2007 | Krein et al. |
| 7,336,787 B2 * | 2/2008 | Unger et al. ................. 380/217 |
| 7,360,233 B2 | 4/2008 | Russ et al. |
| 7,360,235 B2 | 4/2008 | Davies et al. |
| 7,366,914 B2 * | 4/2008 | Graunke ..................... 713/190 |
| 7,392,389 B2 * | 6/2008 | Kori ............................ 713/170 |
| 2001/0005906 A1 * | 6/2001 | Humpleman ................. 725/82 |
| 2001/0017920 A1 * | 8/2001 | Son et al. ..................... 380/212 |
| 2001/0030664 A1 | 10/2001 | Shulman et al. |
| 2001/0039660 A1 * | 11/2001 | Vasilevsky et al. ............ 725/78 |
| 2002/0002707 A1 | 1/2002 | Ekel et al. |
| 2002/0007485 A1 | 1/2002 | Rodriguez et al. |
| 2002/0010936 A1 | 1/2002 | Adam |
| 2002/0019984 A1 | 2/2002 | Rakib |
| 2002/0035726 A1 | 3/2002 | Corl |
| 2002/0035729 A1 | 3/2002 | Diep |
| 2002/0040475 A1 | 4/2002 | Yap et al. |
| 2002/0044762 A1 | 4/2002 | Wood et al. |
| 2002/0051200 A1 | 5/2002 | Chang et al. |
| 2002/0051581 A1 | 5/2002 | Takeuchi et al. |
| 2002/0056112 A1 | 5/2002 | Dureau et al. |
| 2002/0059615 A1 | 5/2002 | Okawara et al. |
| 2002/0059617 A1 | 5/2002 | Terakado et al. |
| 2002/0059637 A1 | 5/2002 | Rakib |
| 2002/0066101 A1 | 5/2002 | Gordon et al. |
| 2002/0067437 A1 | 6/2002 | Tsubouchi et al. |
| 2002/0069417 A1 | 6/2002 | Kliger et al. |
| 2002/0083438 A1 * | 6/2002 | So et al. ........................ 725/31 |
| 2002/0087996 A1 | 7/2002 | Bi et al. |
| 2002/0090198 A1 | 7/2002 | Rosenberg et al. |
| 2002/0095673 A1 | 7/2002 | Leung et al. |
| 2002/0095689 A1 | 7/2002 | Novak |
| 2002/0100041 A1 | 7/2002 | Rosenberg et al. |
| 2002/0104001 A1 * | 8/2002 | Lotspiech et al. ............ 713/163 |
| 2002/0108121 A1 | 8/2002 | Alao et al. |
| 2002/0116626 A1 | 8/2002 | Wood |
| 2002/0133558 A1 | 9/2002 | Fenno et al. |
| 2002/0137517 A1 | 9/2002 | Williams et al. |
| 2002/0141582 A1 * | 10/2002 | Kocher et al. ................ 380/201 |
| 2002/0144262 A1 | 10/2002 | Plotnick et al. |
| 2002/0146237 A1 | 10/2002 | Safadi ........................ 386/94 |
| 2002/0154892 A1 | 10/2002 | Hoshen et al. |
| 2002/0157112 A1 | 10/2002 | Kuhn |
| 2002/0166124 A1 | 11/2002 | Gurantz et al. |
| 2002/0174444 A1 | 11/2002 | Gatto et al. |
| 2002/0178445 A1 | 11/2002 | Eldering |
| 2002/0187779 A1 | 12/2002 | Freeny |
| 2002/0194596 A1 * | 12/2002 | Srivastava ..................... 725/37 |
| 2003/0005300 A1 | 1/2003 | Noble et al. |
| 2003/0009763 A1 | 1/2003 | Crinon et al. |
| 2003/0026423 A1 * | 2/2003 | Unger et al. ................. 380/217 |
| 2003/0028886 A1 * | 2/2003 | Wang et al. ................... 725/78 |
| 2003/0028890 A1 | 2/2003 | Swart et al. |
| 2003/0044165 A1 | 3/2003 | Wood et al. |
| 2003/0063003 A1 | 4/2003 | Bero et al. |
| 2003/0063814 A1 | 4/2003 | Herley |
| 2003/0097563 A1 * | 5/2003 | Moroney et al. ............. 713/170 |
| 2003/0108199 A1 * | 6/2003 | Pinder et al. ................. 380/200 |
| 2003/0108336 A1 | 6/2003 | Schramel |
| 2003/0142664 A1 | 7/2003 | Gerszberg et al. |
| 2003/0145336 A1 * | 7/2003 | Matsuzaki et al. ........... 725/136 |
| 2003/0149986 A1 * | 8/2003 | Mayfield et al. .............. 725/63 |
| 2003/0149991 A1 | 8/2003 | Reidhead et al. |
| 2003/0159140 A1 * | 8/2003 | Candelore .................... 725/31 |
| 2003/0159157 A1 | 8/2003 | Chan |
| 2003/0181160 A1 | 9/2003 | Hirsch |
| 2003/0202772 A1 | 10/2003 | Dow et al. |
| 2003/0204856 A1 | 10/2003 | Buxton |
| 2003/0207672 A1 | 11/2003 | Dang et al. |
| 2003/0233667 A1 | 12/2003 | Umipig et al. |
| 2003/0235308 A1 * | 12/2003 | Boynton et al. .............. 380/270 |
| 2004/0017913 A1 * | 1/2004 | Hawkes et al. ................ 380/37 |
| 2004/0028216 A1 | 2/2004 | Freyman |
| 2004/0032902 A1 | 2/2004 | Koifman et al. |
| 2004/0032950 A1 * | 2/2004 | Graunke ...................... 380/42 |
| 2004/0034874 A1 | 2/2004 | Hord et al. |
| 2004/0040035 A1 * | 2/2004 | Carlucci et al. ............... 725/32 |
| 2004/0051638 A1 | 3/2004 | Green |
| 2004/0054771 A1 | 3/2004 | Roe et al. |
| 2004/0064714 A1 | 4/2004 | Carr |
| 2004/0068739 A1 | 4/2004 | Russ |
| 2004/0068747 A1 | 4/2004 | Robertson |
| 2004/0068754 A1 | 4/2004 | Russ |
| 2004/0078825 A1 | 4/2004 | Murphy |
| 2004/0107445 A1 | 6/2004 | Amit |
| 2004/0109497 A1 | 6/2004 | Koval |
| 2004/0128681 A1 | 7/2004 | Hancock |
| 2004/0128682 A1 | 7/2004 | Liga |
| 2004/0172658 A1 | 9/2004 | Rakib et al. |
| 2004/0177731 A1 * | 9/2004 | Kliger et al. ................. 725/131 |
| 2004/0221304 A1 | 11/2004 | Sparrel |
| 2004/0255326 A1 | 12/2004 | Hicks et al. |
| 2004/0257976 A1 | 12/2004 | Alsobrook et al. |
| 2004/0261126 A1 | 12/2004 | Addington et al. |
| 2005/0022248 A1 | 1/2005 | Robertson et al. |
| 2005/0028190 A1 | 2/2005 | Rodriguez et al. |
| 2005/0028208 A1 | 2/2005 | Ellis et al. |
| 2005/0042999 A1 | 2/2005 | Rappaport |
| 2005/0050557 A1 | 3/2005 | Gabryjelski et al. |
| 2005/0063422 A1 | 3/2005 | Lazar et al. |
| 2005/0155052 A1 | 7/2005 | Ostrowska |
| 2005/0235323 A1 | 10/2005 | Ellis et al. |
| 2005/0251827 A1 | 11/2005 | Ellis et al. |
| 2005/0262542 A1 | 11/2005 | DeWeese et al. |
| 2006/0069645 A1 | 3/2006 | Chen et al. |
| 2006/0218591 A1 | 9/2006 | Billmaier et al. |
| 2006/0259584 A1 | 11/2006 | Watson et al. |

FOREIGN PATENT DOCUMENTS

| | | |
|---|---|---|
| EP | 0989557 | 3/2000 |
| EP | 1028551 | 8/2000 |
| EP | 107600 | 6/2001 |
| EP | 1117214 | 7/2001 |
| EP | 1175087 | 7/2001 |
| EP | 1213919 | 6/2002 |
| EP | 1443766 | 8/2004 |
| EP | 1463324 | 9/2004 |
| WO | WO 95/25402 | 9/1995 |
| WO | WO 98/26584 | 6/1998 |
| WO | WO 98/37648 | 8/1998 |
| WO | WO 99/01984 | 1/1999 |
| WO | WO 99/35844 | 7/1999 |
| WO | WO 99/65244 | 12/1999 |
| WO | WO 00/35201 | 6/2000 |
| WO | WO 01/47234 | 6/2001 |

| | | |
|---|---|---|
| WO | WO 01/56286 | 8/2001 |
| WO | WO 01/74003 | 10/2001 |
| WO | WO 01/86948 | 11/2001 |
| WO | WO 02/11418 | 2/2002 |
| WO | WO 02/11446 | 2/2002 |
| WO | WO 02/17642 | 2/2002 |
| WO | WO 02/097997 | 12/2002 |
| WO | WO 03/032620 | 4/2003 |
| WO | WO03032620 | 4/2003 |
| WO | WO 03/039154 | 5/2003 |
| WO | 2004023717 | 3/2004 |
| WO | WO 2004/023717 | 3/2004 |
| WO | 2004036892 | 4/2004 |
| WO | WO 2004/032514 | 4/2004 |
| WO | WO 2004/036808 | 4/2004 |
| WO | WO 2004/036892 | 4/2004 |
| WO | WO 2004/098190 | 11/2004 |

OTHER PUBLICATIONS

Kerr, G., "A Review of Fully Interactive Video on Demand" Signal Processing. Image Communication, Elsevier Science Publishers, Amsterdam, NL, vol. 8, No. 3, Apr. 1996, pp. 173-190, XP004047063 ISSN: 0923-5965.

Alexis De Lattre et al., Videolan Streaming (online) Feb. 12, 2005, pp. 1-14 (Cited by Examiner, no copy available).

Alexis De Lattre et al., Videolan Streaming Howto, 2005, pp. 1-61 (Cited by Examiner, no copy available).

Microsoft Computer Dictionary, 1999, Microsoft Press, 4th Edition, p. 123.

U.S. Appl. No. 09/332,244, Ellis et al., filed Jun. 11, 1999 is included by reference by 2005/0028208 (Not published).

U.S. Appl. No. 10/008,581, filed Nov. 13, 2001, Entitled "Networked Subscriber Television Distribution," Inventors: Russ, et al.

U.S. Appl. No. 10/104,921, filed Mar. 22, 2002, Entitled "Exporting Data from a Digital Home Communication Terminal to a Client Device," Inventors: Gaul, et al.

U.S. Appl. No. 10/212,017, filed Aug. 2, 2002, Entitled "Locally-Updated Interactive Program Guide," Inventors: Russ et al.

U.S. Appl. No. 10/263,270, filed Oct. 2, 2002, Entitled "Video Transmission Systems and Methods for a Home Network," Inventors: Robertson et al.

U.S. Appl. No. 10/342,670, filed Jan. 15, 2003, Entitled "Networked Multimedia System," Inventors: Robertson et al.

U.S. Appl. No. 10/403,485, filed Mar. 31, 2003, Entitled "Networked Multimedia System having a Multi-Room Interactive Network Guide," Inventors: Russ et al.

U.S. Appl. No. 10/998,879, filed Nov. 29, 2004, Entitled "Consolidating Video on Demand (VOD) Services with Multi-Room Personal Video Recording (MR-PVR) Services," Inventors: Schutte, et al.

U.S. Appl. No. 10/294,947, filed Nov. 14, 2002, Entitled "Networked Subscriber Television Distribution," Inventors: Russ, et al.

U.S. Appl. No. 10/676,968, filed Oct. 1, 2003, Entitled "Proximity Detection using Wireless Connectivity in a Communications System," Inventors: Claussen, et al.

U.S. Appl. No. 11/069,440, filed Mar. 1, 2005, Entitled "Interactive Network Guide with Parental Monitoring," Inventors: Ostrowska, et al.

U.S. Appl. No. 10/924,077, filed Aug. 23, 2004, Entitled "Full Duplex Wideband Communications System for a Local Coaxial Network," Inventors: Robertson, et al.

U.S. Appl. No. 11/564,347, filed Nov. 29, 2006, Entitled "Viewer Data Collection in a Multi-Room Network," Inventor: Russ, Samuel H.

U.S. Appl. No. 11/162,232, filed Sep. 2, 2005, Entitled "Multiroom Point of Deployment Module," Inventors: Wall, et al.

U.S. Appl. No. 10/923,948, filed Aug. 23, 2004, Entitled "Optimization of a Full Duplex Wideband Communications System," Inventors: Robertson, et al.

U.S. Appl. No. 11/069,439, filed Mar. 1, 2005, Entitled "Parental Control for a Networked Multi-Room System," Inventors: Ostrowska, et al.

U.S. Appl. No. 10/036,329, filed Feb. 25, 2008, Entitled "Full Duplex Wideband Modem Communications system for a Local Coaxial Network," Inventors: Robertson, et al.

\* cited by examiner

NETWORKED MULTIMEDIA OVERLAY SYSTEM

CROSS-REFERENCE TO RELATED PATENT APPLICATIONS

The present application is a continuation-in-part of and incorporates in its entirety copending U.S. patent application Ser. No. 10/342,670 filed Jan. 15, 2003, which claims priority to U.S. provisional application having Ser. No. 60/416,155 filed on Oct. 4, 2002, and U.S. provisional application having Ser. No. 60/424,269 filed on Nov. 6, 2002.

FIELD OF THE INVENTION

This invention relates in general to broadband communications systems, and more particularly, to the field of set-top terminals and a networked multimedia overlay system.

DESCRIPTION OF THE RELATED ART

Communications systems, such as a cable or satellite broadband system, transmit signals including video, voice, and data to receiving devices. Generally, the signals are encrypted with a proprietary encryption scheme prior to transmitting to avoid theft of the signals. The receiving devices, such as set-top terminals, include a decryption device that then correlates with the transmitting encryption device. Accordingly, it is difficult for operators to switch set-top terminal manufacturers because of the proprietary encryption/decryption scheme. Additionally, if an operator wants to use set-top terminals manufactured by another vendor, there needs to be cooperation between the manufacturers to license one of the decryption schemes to the other vendor depending upon which encryption scheme is used.

The encryption and decryption techniques used for signal encoding and decoding belong to two general classes: symmetrical key techniques and public key techniques. A symmetrical key encryption system is one in which the sending device encrypts the signals using its copy of the key and the receiving device decrypts the signals using its copy of the key. It is well known in the art that the symmetrical key technique is considered a non-persistent method where the keys are routinely changed. A public key encryption system is one in which the sending device and the receiving device each has its own public key-private key pair. Signals encrypted with the public key can only be decrypted with the private key and vice-versa. Thus, as long as a device keeps its private key secret, it can provide its public key to any other device that wishes to communicate with it. The other device simply includes that public key in the encrypted signal, and the receiving device then uses its private key, along with the encrypted public key, to decrypt the signals. The public key technique is considered a non-persistent technique where the keys are not changed and remain the same. Further information regarding encryption and decryption can be found in U.S. Pat. No. 6,292,568, the disclosure and teachings of which are hereby incorporated by reference.

A set-top terminal (STT) is typically connected to a television set and located at the home of the cable or satellite system subscriber. Since the STT is located in the subscriber's premises, it may be used by two or more users (e.g., household members). Television has become so prevalent in the United States, however, that the typical household may have two or more television sets, each television set requiring its own STT if the subscriber wishes to have access to enhanced functionality. However, STTs can be expensive and users may not be willing to purchase additional expensive STTs. This is particularly true of STTs incorporating PVR functionality since such devices require not only the addition of a hard disk drive but also additional processing components and software.

Therefore, there exists a need for systems and methods for addressing these and/or other problems associated with STTs. Specifically, there exists a need for systems and methods that allow multiple operating discrete STTs within a subscriber premises or other local area to have secure access to programming and content received by and/or stored in another STT. Additionally, a need exists for the operator to utilize different manufacturer's STTs that coexist in the subscriber premises.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Preferred embodiments of the invention can be understood in the context of a broadband communications system and a local network. Note, however, that the invention may be embodied in many different forms and should not be construed as limited to the embodiments set forth herein. For example, transmitted broadband signals include at least one of video/audio, telephony, data, or Internet Protocol (IP) signals, to name but a few. Furthermore, remote devices included in the broadband communications system receiving the transmitted broadband signals may include a remote set-top terminal, a television, a consumer electronics device such as a DVD player/recorder, a computer, a personal digital assistant (PDA), or other device. All examples given herein, therefore, are intended to be non-limiting and are provided in order to help clarify the description of the invention.

The present invention is directed towards a networked multimedia overlay system (NMOS) that is suitable for use in a broadband communications system. The NMOS is typically located within a subscriber premises. It will be appreciated, however, that the NMOS can also be used in a multi-unit dwelling, business, school, hotel, or hospital, among others. Advantageously, the NMOS allows the premises to be locally networked (i.e., home-networked). In accordance with the present invention a primary set-top terminal (STT) receives and forwards broadband multimedia content signals (e.g., digital or analog cable television channels (i.e., audio/video signals), IP signals, VOD signals, stored presentations, software application signals, administrative signals, etc.) throughout the local network to a plurality of remote set-top terminals (STTs). Additionally, the remote STTs are each capable of requesting from the primary STT and seamlessly receiving, for example, a cable channel, a stored or recorded presentation, a VOD movie, or the interactive program guide, just as if the remote terminals were equipped with the primary STT functionality while also receiving broadband signals directly from the provider. In other words, the remote terminals may be simplified, less-costly versions of the primary STT but are capable of utilizing, via the local network, some or all of the advanced hardware and software features, such as memory, a mass storage device, or software applications, that are available in the primary STT.

Figure 1:
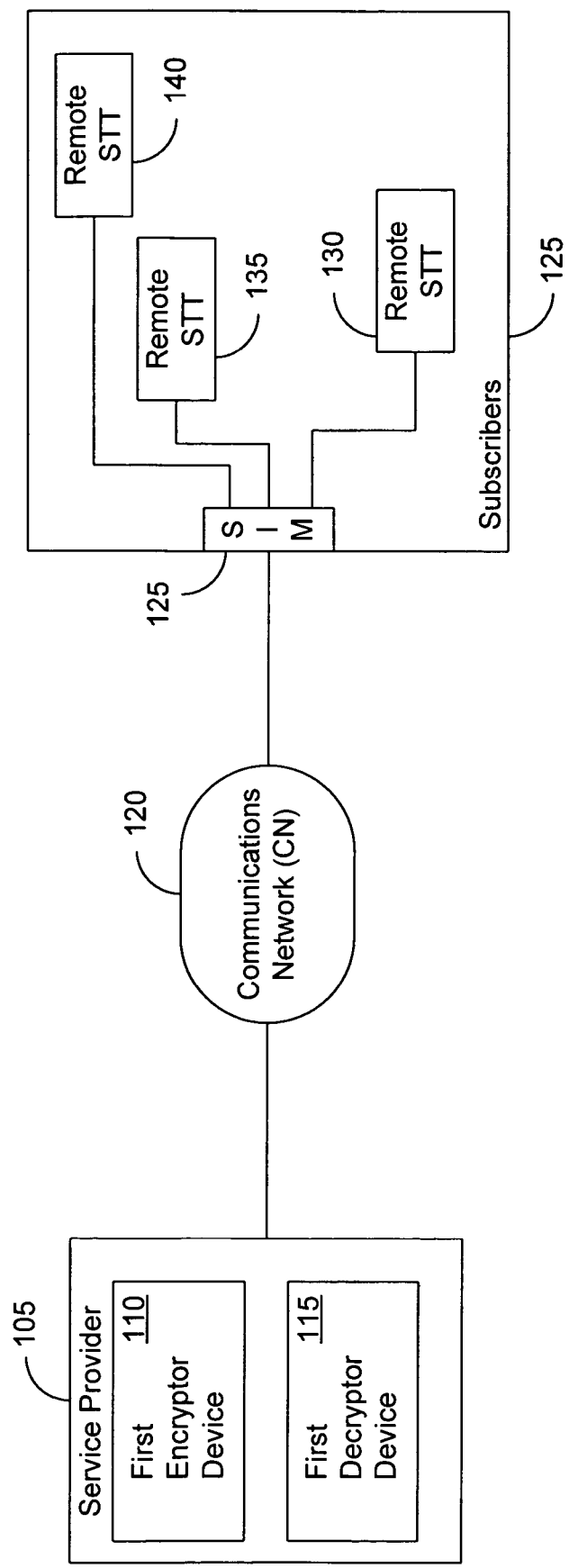
FIG. 1 illustrates a simplified drawing of a system that transmits signals having a first encryption scheme and a plurality of receiving devices each having either a first decryption scheme or a first and second decryption scheme.

Furthermore, the present invention is directed towards an NMOS that includes a primary STT and remote STTs that may have different decryption schemes. FIG. 1 illustrates a simplified drawing of a system that transmits signals having a first encryption scheme and a plurality of receiving devices each having either a first decryption scheme or a first and second decryption scheme. More specifically, a service provider 105 transmits signals that have been encrypted by a first encryptor device 110. The service provider 105 also has a first decryptor device 115 for decrypting any reverse signals that have been encrypted with the first encryption scheme. The encrypted signals are transmitted over a communications network 120 to a plurality of subscribers 125. It will be appreciated that the application addresses only two different encryption/decryption schemes, but that more schemes may exist in the system and is anticipated by the teachings herein. Additionally, only one subscriber 125 is shown for convenience, but there are obviously many subscribers in the network.

In an exemplary embodiment of the present invention, a splitter isolator module (SIM) 125 receives the signals and provides the signals having the first encryption scheme to a plurality of receiving STTs 130, 135, 140. A primary STT 130 includes a decryptor device that decrypts the first encryption scheme and also includes one or more encryptor/decryptor devices that encrypt and decrypt additional encryption schemes. Additionally, one remote STT 135 may have two decryptor devices that each decrypts either the first or the second encryption schemes, and another remote STT 140 may have a decryptor device that decrypts just the first encryption scheme.

It will be appreciated that the content transmitted between the primary and remote STTs 130, 135, 140 should be encrypted so that pirating or theft of the signals can be prevented. Preferably, the encryption should not be a persistent encryption method, which includes expiring keys since there would be a time limit associated with a stored program. It is also possible that a second decryption scheme may be a stronger encryption scheme than the first encryption scheme. In accordance with the present invention, the NMOS operates such that the primary STT 130 provides encrypted signals, such as stored programs, to a requesting remote STT 135, 140 in accordance with the requesting remote STT's decryption capabilities. In other words, if a remote STT 135, 140 has a first and second decryptor device for decrypting either encryption scheme, the primary STT 130 sends the stored content signals encrypted with the second encryption scheme, which preferably is a non-persistent encryption scheme. If, however, a remote STT 135, 140 has only a first decryptor device for decrypting the first encryption scheme, the primary STT 130 sends the stored content signals encrypted with the first encryption scheme. Importantly, the remote STTs that have only the first decryptor device do not have to be replaced or upgraded to receive stored content from the primary STT 130. Additionally, the operator can use at least two different set-top terminal manufacturers in the system.

Figure 2:
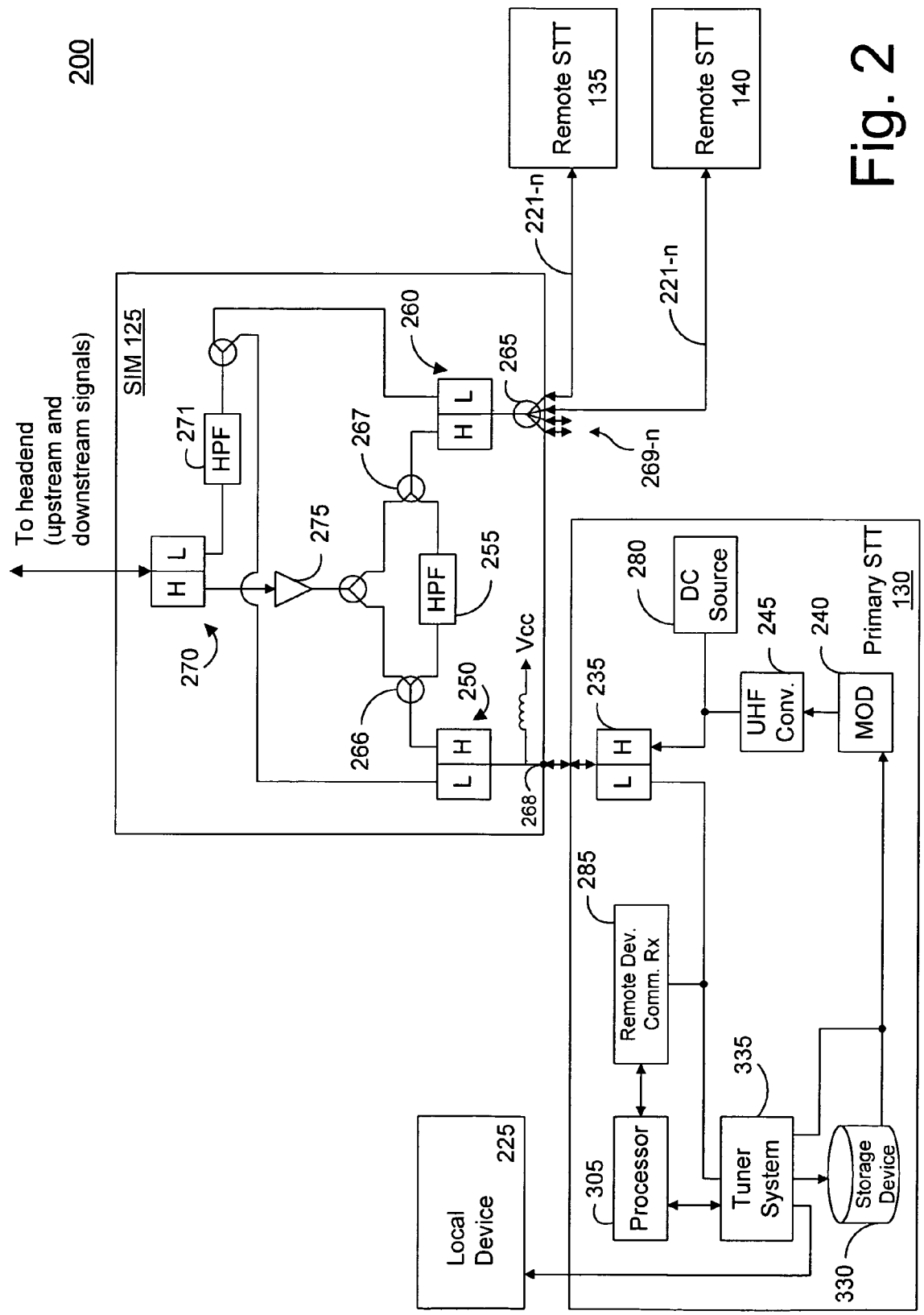
FIG. 2 is a block diagram illustrating one preferred embodiment of a networked multimedia overlay system (NMOS) in accordance with the present invention.

FIG. 2 is a block diagram illustrating one preferred embodiment of a networked multimedia overlay system (NMOS) 200 in accordance with the present invention. The NMOS 200 includes a master or primary STT 130, a splitter/isolation module (SIM) 125, and a plurality of remote STTs 135, 140. It is to be noted that while the embodiment of FIG. 2 illustrates an NMOS having only two remote devices, the invention is not so limited. Indeed, any number of such remote devices may be employed, consistent with the requirements and capabilities of the NMOS, as described herein. Briefly, the SIM 125 receives downstream broadband signals from, for example, the headend or satellite (i.e, satellite provider) and subsequently provides the downstream signals to the primary STT 130 or to both the primary STT 130 and any one or all of the plurality of remote STTs 135, 140 depending on the implementation.

Upon command, the primary STT 130 may also forward selected real-time downstream signals and/or stored signals to one or all of the remote STTs 135, 140 via the SIM 125. More specifically, the plurality of remote STTs 135, 140 communicates with the primary STT 130 by sending reverse control/command signals via cables 220, 221-n requesting stored presentations or real-time signals. It will be appreciated that wired mediums, such as coaxial, telephone lines, or data cables, may be used so long as the transport format accommodates the desired transmission medium. Advantageously, in accordance with the present invention, the plurality of remote STTs 135, 140 have access to all of the primary STT's hardware and software functionality, along with receiving downstream signals directly from the headend via the SIM 125. In this manner, the remote STTs 135, 140 may have limited functionality, thereby decreasing the overall costs to the service provider and the subscriber while offering advanced services to all of the remote devices that are networked.

Furthermore, the primary STT 130 may also directly provide broadband signals to a coupled local device 225, which may be, for example, a television, computer, or PDA. It will be appreciated that the primary STT 130 may transmit signals to and receive control signals from the local device 225 via wireless devices (e.g., RF or IR devices) or a wired medium (e.g., coaxial cable, power lines, or telephone lines). It will also be appreciated that the primary STT 130 may be incorporated in the local device 225. The primary STT 130 optionally includes, for example, an IR receiver 368 (FIG. 3) for receiving user input control signals (e.g., signals indicating a channel change, IPG display, volume control, or administrative signals) that are encoded in an IR signal. Those of ordinary skill in the art would understand elements and operation of a typical IR receiver 368. Further information regarding the transmitting and receiving of signals between the primary STT and the coupled local device via wireless devices or a wired medium can be found in copending U.S. patent application Ser. No. 10/008,581, the teachings of which are hereby incorporated by reference.

FIG. 2 also includes a simplified, non-limiting block diagram illustrating selected components of the primary STT 130 in accordance with one preferred embodiment of the present invention. In other embodiments, a primary STT 130 may include only some of the components shown, in addition to other components that are not shown in FIG. 2. The primary STT 130 has electronic components (e.g., processor 305, memory 310, etc.) that are coupled to a local interface 315, which can include, for example, one or more buses or other wired or wireless connections. The processor 305 is a hardware device for executing software, particularly that stored in memory 310. The processor 305 can be a custom-made or commercially available processor for executing software instructions. When the primary STT 130 is in operation, the processor 305 is configured to execute software stored within the memory (not shown), to communicate data to and from the memory, and to generally control operations of the primary STT 130 according to the software.

The memory system may include any one or combination of volatile memory elements (e.g., random access memory (RAM), dynamic RAM (DRAM), static RAM (SRAM), synchronous DRAM (SDRAM), magnetic RAM (MRAM), etc.) and nonvolatile memory elements (e.g., read only memory (ROM), hard drive, tape, compact disc ROM (CD-ROM), etc.). Moreover, the memory system may incorporate electronic, magnetic, optical and/or other types of storage multimedia. Note that the memory system can have a distributed architecture, where various memory components are situated remotely from one another, but can be accessed by the processor 305.

The software in memory may include one or more separate programs, each of which comprises executable instructions for implementing logical functions. The software in memory includes an operating system (OS), a WatchTV application, a navigator application, a personal video recorder (PVR)/digital video recorder (DVR) application, a driver, a VOD application, and an IPG application, among others. The OS controls the execution of other software and provides management and control services including, for example, scheduling, input-output control, file and data management, memory management, and communication control. The WatchTV application is used to help provide a user with a requested broadcast television channel. The IPG application provides an interactive program guide that mainly includes listings of television channels provided by the primary STT 130, but may also present additional services, such as an NMOS interactive guide. The navigator application is used to route user input commands to respective software applications that have registered with the navigator application to receive the respective commands. The VOD application provides a user with video-on-demand presentations, such as, for example, movies that are selected via an on-screen movie catalog. The PVR application may provide user interface (UI) screens that can be used to manage (e.g., record, playback, and delete) the content of a storage device 330. Accordingly, the PVR application may record or delete data from the storage device 330 with the help of a software driver, which controls read and write operations performed on the storage device 330. In one preferred embodiment, the storage device 330 includes a hard drive that reads from and writes to a hard disk. It will be appreciated that other software applications may be included in memory.

A tuner system 335 includes, in one implementation, an out-of-band tuner (not shown) for receiving out-of-band signals (e.g., administrative signals that were modulated using quadrature phase shift keying (QPSK)), and a plurality of in-band tuners (e.g., quadrature amplitude modulation (QAM)/analog tuners) for receiving analog and/or digital in-band television channels. Alternatively, the tuner system 335 may only include one in-band tuner depending on a desired implementation. Although shown as one module, the signal processing system may comprise multiple modules that are located in different parts of the primary STT 130. It will be appreciated that in the preferred embodiment of the present invention the number of tuners typically corresponds to at least the optional coupled local device(s) 225 and the storage device 330. Further information regarding adding additional tuners can be found in copending U.S. patent application Ser. No. 10/263,449, which was filed on Oct. 2, 2002, the teachings of which are hereby incorporated by reference.

The primary STT 130 receives via the SIM 125 downstream broadband signals (i.e., signals that are typically in a frequency range from 45 MHz to 870 MHz). A low pass filter in diplex filter 235 provides the downstream signals to the tuner system 335 and the remote device command receiver 285. Upon command from the processor 305, the tuner system 335 may send the downstream signals to any local devices 225, the storage device 330 for optional storage, and additionally to a modulator 240. More specifically, the processor 305 instructs the tuner system 335 to extract specified content signals from the downstream signals. By way of example, a tuner 340 responsive to the coupled local device 225 provides selected content signals directly to the local device 225. The tuner system 335 that is responsive to the remote STTs 135, 140 via the processor 305 may forward selected real-time presentations directly to the modulator 240 for transmission to the plurality of remote STTs 135, 140. Furthermore, upon user input from the primary STT 130 or any one of the remote STTs 135, 140, the processor 305 may instruct the tuner system 335 to provide content presentations to the storage device 330 for storage. The stored presentations are subsequently available for forwarding to any of the remote STTs 135, 140 and/or the local device 255 upon instruction from the processor 305. User input signals will be discussed in further detail hereinbelow relating with a preferred embodiment of the remote STTs 135, 140.

In accordance with the present invention, the modulator 240 modulates the selected content signals (i.e., NMOS presentations) provided from either the tuner system 335 or the storage device 330 prior to forwarding to the SIM 125. For example, a preferred embodiment of the present invention uses a QAM modulator, which may be used for effectively transmitting signals over coaxial cable in a cable television environment. Other embodiments may include a QPSK modulator in a satellite environment, an 8VSB (8-vestigial sideband) modulator in a digital terrestrial environment in the U.S., and a COFDM (coded orthogonal frequency division multiplexing) modulator in a digital terrestrial environment in Europe, or alternatively an analog modulator. The modulator 240 converts the signals to a predetermined intermediate frequency. Subsequently, the modulated presentations are up-converted to a predetermined higher frequency that is preferably greater than the highest frequency used in the system with, for example, a UHF converter 245. A preferred embodiment of the present invention is to up-convert the NMOS presentations to an available high frequency channel, for example, channel 134, which may have a frequency range from 852 MHz to 858 MHz. The service provider, therefore, would provide downstream signals in the range from 45 MHz to approximately 840 MHz, thereby leaving frequencies greater than 840 MHz available for the transmission of NMOS presentations. Accordingly, the NMOS presentations 405 do not interfere with the downstream signals that may be concurrently provided via the common cables 220, 221-$n$ to the primary STT 130 and the remote STTs 135, 140. It will be appreciated that other frequency ranges can be used that are either in-band (e.g., from 45 MHz to 860 MHz) or out-of-band (e.g., from 865 MHz to 1 GHz) so long as the predetermined frequency range is not used for transmission of the downstream signals or is within the range that is tunable by the plurality of remote STTs 135, 140. The up-converted NMS presentations are subsequently provided to the SIM 125 via a high pass filter in the diplex filter 235.

Furthermore, the remote device command receiver 285 is included in the primary STT 205 for receiving reverse NMOS command signals from the plurality of remote STTs 135, 140. Command signals can be transmitted in the form of on-off keying (OOK) signals, frequency shift keying (FSK) signals, or serial data transmissions. Additionally, command signals can be transmitted from the remote STTs 135, 140 as IP signals to the service provider. The signals would include the primary STT 130 address in the NMOS, and the service provider then routes the IP signals to the primary STT 130. The remote device command receiver 285, therefore, includes the respective demodulator, such as an OOK demodulator or an FSK demodulator that demodulates the signals as known to one skilled in the art.

The selected NMOS presentations are provided by the primary STT 130 to the SIM 125 via the cable 220. In a first embodiment of the SIM 125, the selected NMOS presentations are routed to the plurality of remote STTs via a diplex filter 250. A splitter 266 provides the NMOS presentations to high pass filter (HPF) 255, which subsequently provides the filtered NMS presentations to splitter 267, diplex filter 260, and splitter 265. The HPF 255 has low attenuation at the frequencies of the NMOS presentation and high isolation at lower frequencies, and, thus, provides high isolation between port 268 and ports 269-*n* at these lower frequencies. It will be appreciated that a bandpass filter (BPF) can alternatively be used depending on the transmission frequencies of the NMS presentations. Splitter 265 provides the NMS presentations to the plurality of remote STTs 135, 140. It will be appreciated that, at the frequencies of the NMOS presentations, splitters 266 and 267 provide low insertion loss between port 268 and the splitter 265, thereby ensuring the NMOS presentations are routed to the plurality of remote STTs. Additionally, in an active SIM 125, the amplifier 275 further prevents the NMOS presentations from reaching the CN 120.

Moreover, diplex filters 250 and 270 provide a path for upstream signals from the primary STT 130 to the service provider. Similarly, diplex filters 260 and 270 provide a path for upstream signals from the plurality of remote STTs 135, 140 to the service provider. A high pass filter 271 allows any upstream signals (e.g., signals ranging from 5 MHz to 45 MHz) to pass through to the diplex filter 270 on to the CN 120. It will be appreciated that the reverse signals intended to remain in the NMOS 200, such as reverse command signals from the remote STTs 135, 140, are reflected back and routed to the primary STT 130. Furthermore, the SIM 125 receives the downstream broadband signals from the service provider 105 at diplex filter 270, which provides the downstream signals to the primary STT 130 or, alternatively, to both the primary STT 130 and the plurality of remote STTs 135, 140.

Notably, the preferred embodiments of the SIM 125 provide protection against any of the reverse command signals from leaving the NMOS 200, thereby ensuring proper delivery to the primary STT 130 while also avoiding any interference with separate networked multimedia systems that may be in close proximity. A further advantage is that the SIM 125 enhances privacy and security by making the NMOS 200 unobservable to any upstream devices in the CN 120.

It will be appreciated that the remote STTs 135, 140 may be identical to the primary STT 130 and just share the storage device contents of the primary STT 130. Alternatively, the remote STTs 135, 140 may be a simplified or conventional version of the primary STT 130. A processor 305 and a tuner system 335, which may be a simplified processor and only one tuner, may be included to extract channels from the received downstream broadband signals. Additionally, decryptors and decoders may be included to decode encoded signals for proper processing and display. Furthermore, the remote STTs 135, 140 may or may not include memory for storage of presentations. Preferably, the remote STTs 135, 140 include a user input receiver, such as an IR receiver or an RF receiver, that receives signals from a remote control, such as an IR remote control or an RF remote control. It will be appreciated that the remote control is not required, and any user input device could be incorporated in the remote STTs 135, 140.

Figure 3:
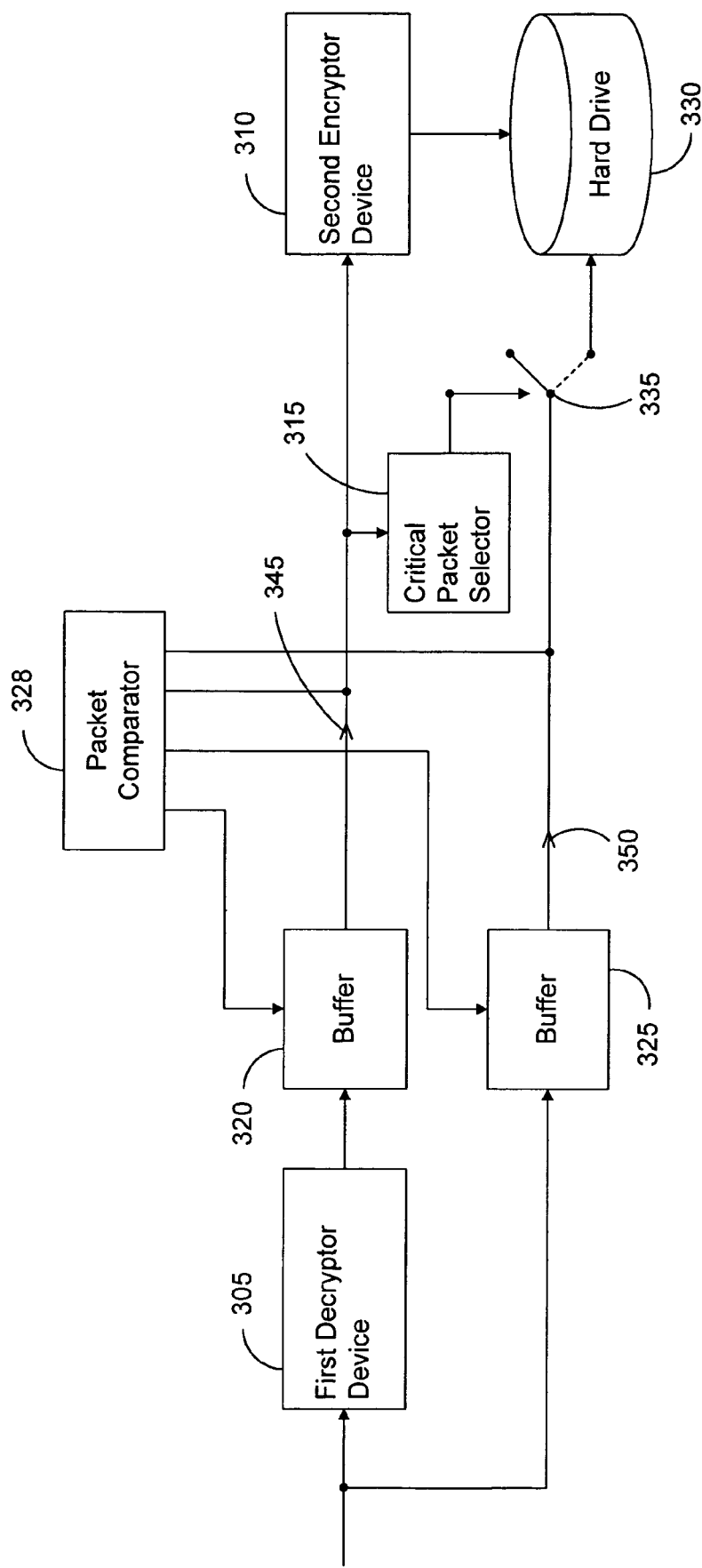
FIG. 3 is a block diagram illustrating the primary STT 130 including a first decryptor device, a first encryptor device, and a critical packet selector for receiving and storing selected programs in accordance with the present invention.

FIG. 3 is a block-diagram illustrating the primary STT 130 including a first decryptor device 305, a second encryptor device 310, and a critical packet selector 315 for receiving and storing selected programs in accordance with the present invention. A first decryptor device 305 receives the incoming signals that have been encrypted by the first encryption scheme via the first encryptor device 110 (FIG. 1) and decrypts the signals. The decrypted stream (i.e., 100% of the clear stream) is provided to a buffer 320. Additionally, the incoming signals are provided to a second buffer 325. A packet comparator 328 compares the packets in the buffered streams to ensure they are aligned due to any delays introduced by the decryptor device 305. The critical packet selector 315 uses the clear stream 345 as a reference stream and controls switch 335. More specifically, switch 335 allows the packets of buffered stream 350 to drop until a critical packet is detected in the clear stream 345. When a critical packet is detected, switch 335 provides the packet of buffered encrypted stream 350 to the hard drive 330 for storage. It will be appreciated that the stored packets of the buffered stream 350 are still encrypted by the first encryption scheme. The clear stream 345, including all critical packets, is encrypted by the second encryptor device 310, where the second encryptor device 310 has a second encryption scheme that uses a non-persistent technique, such as 3DES, AES Mutli-2, or DVB-CSA, and subsequently provides the second encrypted stream to the hard drive 330 for storage.

In accordance with the present invention, 100% of the second encrypted program is stored along with a percentage, such as from 2% to 6%, of the selected packets of the first encrypted program for each program. The second encrypted program and the first encrypted packets are indexed in a table for later retrieval. The indexing can use, for example, Moving Pictures Experts Group (MPEG) header information or program identification (PID) numbers along with time stamps. When a user using a remote STT 135, 140 desires to view a program that has been stored on the primary STT hard drive 330, a signal is sent to the primary STT 130. The signal is indicative of the desired program as well as the particular requesting remote STT 135. Referring again to FIG. 2, the remote device communication receiver 285 receives the signal, and the processor 305 determines the storage location of the program in the hard drive 330. Additionally, the processor 305 determines based on predefined characteristics whether the requesting remote STT 135, 140 includes just the first decryptor device or both the first and the second decryptor devices.

Figure 4:
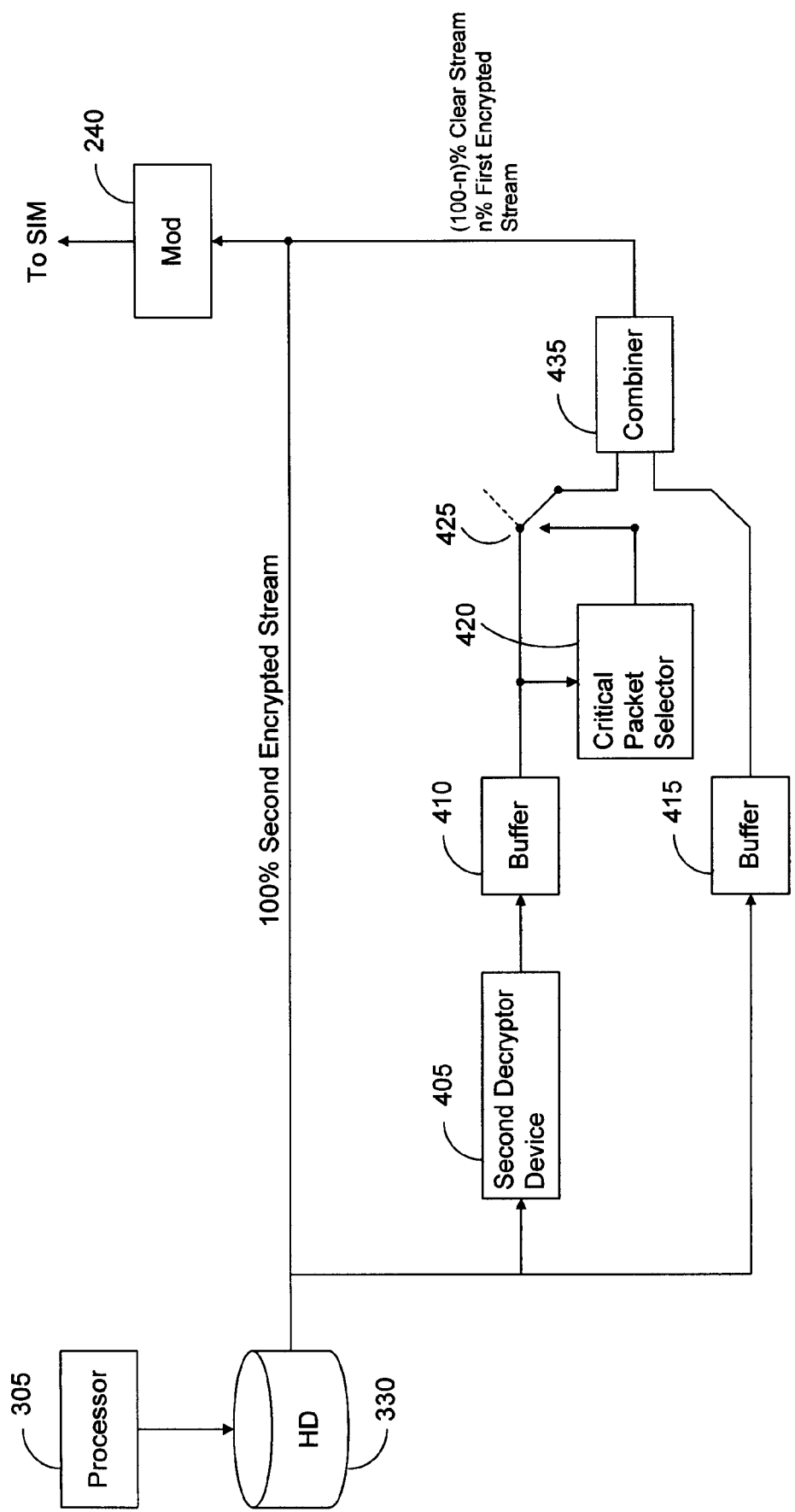
FIG. 4 illustrates the paths of a requested program depending upon the decryption method used in the requesting remote STT in accordance with the present invention.

FIG. 4 illustrates the paths of a requested program depending upon the decryption method used in the requesting remote STT 135, 140 in accordance with the present invention. In the case where the remote STT 135, 140 includes the second decryptor device, the processor sends a copy of the program that was encrypted in the second encryption scheme directly to the modulator 240. The remote STT 135, 140 then decrypts the program using its second decryptor device, which uses a public key-private key technique (i.e., a non-persistent technique).

If, on the other hand, the remote STT 135, 140 includes only the first decryptor device, the processor 305 accesses the second encrypted stored program and sends it to a second decryptor device 405 in the primary STT 130. After decryption, the clear stored program is delayed in buffer 410. Additionally, the processor 305 accesses the percentage of the selected critical packets of the first encrypted program and sends them to buffer 415. A second critical packet selector 420 monitors the clear stream allowing the clear stream to pass through to a combiner 435 until the critical packet is detected. At that point, the critical packet selector 420 controls switch 425 and allows that clear packet to drop. Concurrently, the encrypted critical packet received from buffer 415 passes through to the combiner 435. The combiner 435 combines the clear stream and the first encrypted packets depending upon header information and time stamps, for example, ensuring that they are properly aligned. More specifically, the combined stream includes a percentage of clear packets and the first encrypted critical packets providing a partially encrypted stream. Further information on packet alignment can be found in copending U.S. patent application Ser. No. 10/629,839 filed Jul. 30, 2003, the teachings of which are hereby incorporated by reference. Additionally, a packet comparator, such as the packet comparator in FIG. 3, can be used to ensure that the clear stream and the first encrypted critical packets are aligned correctly leaving the buffers 410, 415. The combined stream is then provided to the modulator 240 and subsequently to the requesting remote STT 135, 140.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A method for providing a networked overlay system, the method comprising the steps of:
    receiving downstream signals encrypted according to a first encryption scheme at a primary device and a plurality of remote devices, the downstream signals including a plurality of programs;
    in the primary device, decrypting at least one of the plurality of programs to provide a clear program;
    encrypting the clear program according to a second encryption scheme to provide a second encrypted program;
    storing the second encrypted program;
    concurrently storing a portion of the at least one program encrypted according to the first encryption scheme by:
        buffering the clear program, the clear program having packets;
        buffering the at least one program encrypted according to the first encryption scheme, the at least one program having packets;
        detecting at least one predetermined critical packet in the clear program;
        wherein packets of the clear program are dropped until such time as the at least one predetermined critical packet is identified, wherein a corresponding critical packet in the at least one program encrypted according to the first encryption scheme that is in accordance with the predetermined critical packet is stored;
    in response to a requesting remote device for a stored program,
    determining the decryption device of the requesting remote device;
    dependent upon the decryption device, accessing the stored program,
    wherein if the decryption device is capable of decrypting programs encrypted according to the second encryption scheme, providing the stored second encrypted program to the requesting remote device;
    wherein if the decryption device is capable of decrypting programs encrypted according to the first encryption scheme but not the second encryption scheme, providing the stored second encrypted program to a second decryptor device;
    decrypting the stored second encrypted program to provide a clear program;
    buffering the clear program;
    concurrently buffering the at least one corresponding critical packet in the at least one program encrypted according to the first encryption scheme;
    detecting the at least one predetermined critical packet in the clear program;
    wherein packets of the clear program are passed through until such time as the at least one predetermined critical packet is detected and the at least one predetermined critical packet is dropped from the program;
    combining the passed clear program packets with the buffered at least one corresponding critical packet encrypted according to the first encryption scheme to provide a partially encrypted program; and
    providing the partially encrypted program to the requesting remote device.

2. The method of claim 1, further comprising the step of modulating the requested stored program to a predetermined frequency.

3. The method of claim 1, further comprising the step of modulating the second encrypted program or the partially encrypted program to a predetermined frequency.

* * * * *